United States Patent
Arimilli et al.

(10) Patent No.: US 6,253,286 B1
(45) Date of Patent: *Jun. 26, 2001

(54) APPARATUS FOR ADJUSTING A STORE INSTRUCTION HAVING MEMORY HIERARCHY CONTROL BITS

(75) Inventors: Ravi Kumar Arimilli, Austin; John Steve Dodson, Pflugerville; Guy Lynn Guthrie, Austin, all of TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/368,755

(22) Filed: Aug. 5, 1999

(51) Int. Cl.[7] .............................. G06F 13/14; G06F 15/18; G05B 13/02
(52) U.S. Cl. .............................. 711/122; 711/120; 700/28
(58) Field of Search ..................................... 712/205, 207; 711/117, 118, 119, 120, 122, 142; 700/28, 32; 717/4

(56) References Cited

U.S. PATENT DOCUMENTS

| | | | |
|---|---|---|---|
| 4,429,363 | * 1/1984 | Duke et al. | 711/122 |
| 5,386,547 | 1/1995 | Jouppi | 711/122 |
| 5,579,493 | * 11/1996 | Kiuchi et al. | 712/207 |
| 5,623,627 | 4/1997 | Witt | 711/122 |
| 5,721,864 | * 2/1998 | Chiarot et al. | 712/207 |
| 5,724,549 | * 3/1998 | Selgas et al. | 711/141 |
| 5,774,685 | * 6/1998 | Dubey | 712/205 |
| 5,809,522 | * 9/1998 | Novak et al. | 711/118 |
| 5,829,038 | * 10/1998 | Merrell et al. | 711/143 |

* cited by examiner

Primary Examiner—David L. Robertson
(74) Attorney, Agent, or Firm—Casimer K. Salys; Bracewell & Patterson, L.L.P.

(57) ABSTRACT

An apparatus for adjusting a STORE instruction having memory hierarchy control bits is disclosed. A multiprocessor data processing system includes a multi-level memory hierarchy. The apparatus for adjusting control bits within an instruction to be utilized within the multi-level memory hierarchy comprises a performance monitor and a bit adjuster. The memory hierarchy control bits indicates a memory level within the multi-level memory hierarchy to which an updating operation should be applied. In response to the outputs from the performance monitor, the bit adjuster alters at least one of the memory hierarchy control bits within the instruction in order to achieve optimal performance for the updating operation.

12 Claims, 4 Drawing Sheets

APPARATUS FOR ADJUSTING A STORE INSTRUCTION HAVING MEMORY HIERARCHY CONTROL BITS

RELATED PATENT APPLICATIONS

The present patent application is related to copending applications:

1. U.S. Ser. No. 09/368,753, filed on even date, entitled "A STORE INSTRUCTION HAVING VERTICAL MEMORY HIERARCHY CONTROL BITS";
2. U.S. Ser. No. 09/368,754, filed on even date, entitled "A STORE INSTRUCTION HAVING HORIZONTAL MEMORY HIERARCHY CONTROL BITS"; and
3. U.S. Ser. No. 09/368,756, filed on even date, entitled "AN OPTIMIZING COMPILER FOR GENERATING STORE INSTRUCTIONS HAVING MEMORY HIERARCHY CONTROL BITS".

BACKGROUND OF THE INVENTION

1. Technical Field

The present invention relates to an apparatus for data processing in general, and in particular to an apparatus for altering bits within an instruction. Still more particularly, the present invention relates to an apparatus for adjusting a STORE instruction having memory hierarchy control bits.

2. Description of the Prior Art

Typically, Reduced Instruction Set Computing (RISC) processors have fewer instructions than their Complex Instruction Set Computing (CISC) counterparts. Thus, to a certain extent, RISC technology simplifies the task of writing compilers for processors that utilize a RISC instruction set. Moreover, from a processor design standpoint, focus can be placed on implementing and optimizing those important and frequently-used instructions rather than having some complex but seldom-used instructions constrain the maximum operating efficiency. Because of the above-mentioned reasons and others, RISC processors are gaining popularity among workstation and even some lower-end computer manufacturers.

For RISC processors, it is common that very few instructions are actually memory access instructions. In fact, some implementations may have only two instructions, LOAD and STORE, that access memories. Typically, a few specialized "atomic" operations may also be supported by the RISC processor for synchronization and memory updates via concurrent processes. Even in such cases, LOAD and STORE instructions are by far the most frequently-used memory access instructions for RISC processors. The execution of a LOAD instruction will cause a processor register to be written with data associated with in a specified main memory address. Conversely, the execution of a STORE instruction will cause data resident in a processor register to be written to a memory hierarchy in association with a main memory address. The present disclosure provides an apparatus for adjusting control bits within a STORE instruction.

SUMMARY OF THE INVENTION

A multiprocessor data processing system includes a multi-level memory hierarchy. In accordance with a preferred embodiment of the present invention, an apparatus for adjusting control bits within an instruction to be utilized within the multi-level memory hierarchy comprises a performance monitor and a bit adjuster. The memory hierarchy control bits indicates a memory level within the multi-level memory hierarchy to which an updating operation should be applied. In response to the outputs from the performance monitor, the bit adjuster alters at least one of the memory hierarchy control bits within the instruction in order to achieve optimal performance for the updating operation.

All objects, features, and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF A PREFERRED EMBODIMENT

Figure 1:
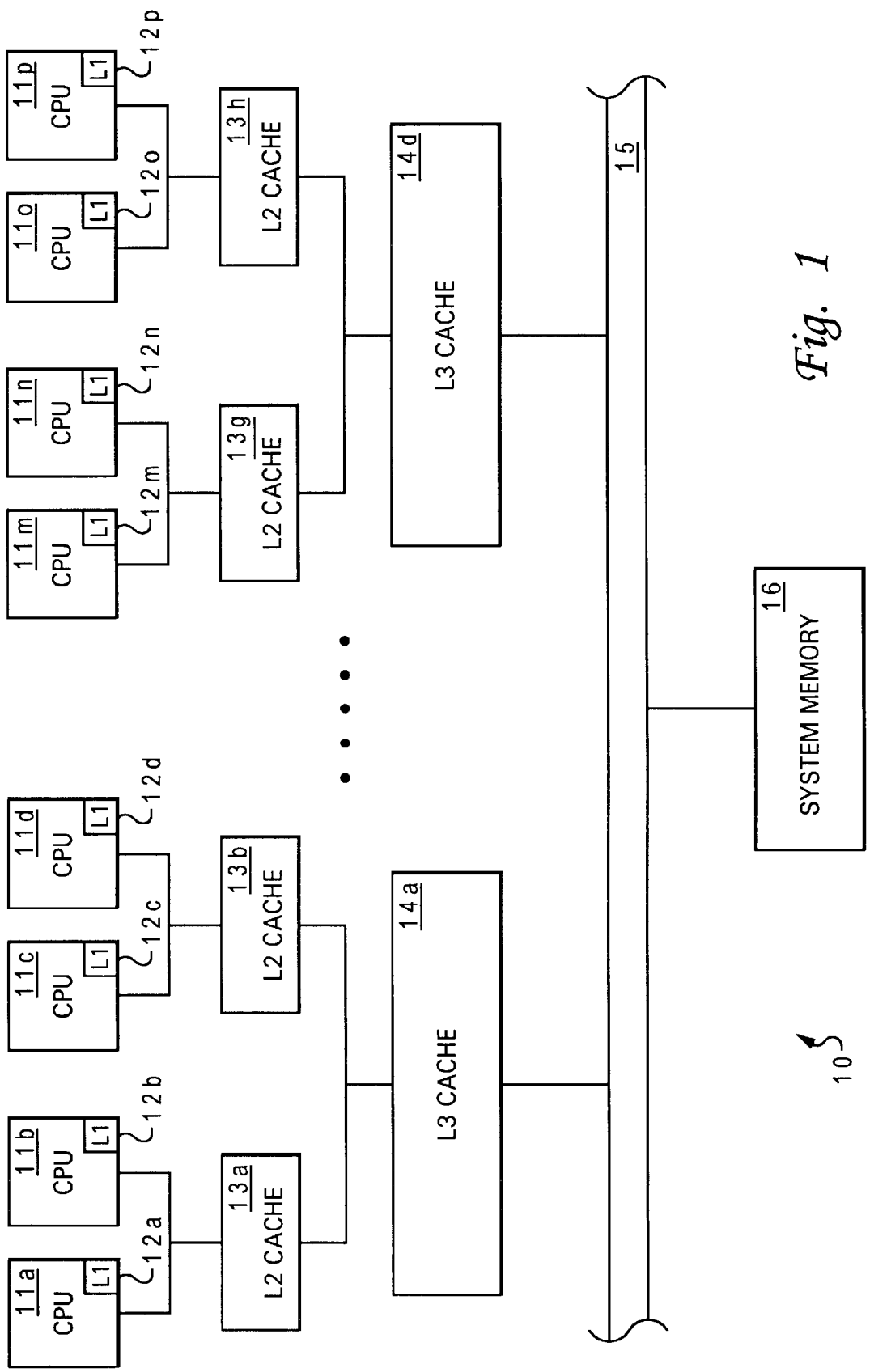
FIG. 1 is a block diagram of a data processing system in which a preferred embodiment of the present invention is incorporated.

Referring now to the drawings and, in particular, to FIG. 1, there is depicted a block diagram of a multiprocessor data processing system 10 in which a preferred embodiment of the present invention is incorporated. As shown, data processing system 10 includes multiple central processor units (CPUs) 11a–11p, and each of CPUs 11a–11p contains a level one (L1) cache. For example, CPUs 11a contains an L1 cache 12a, and CPU 11b contains an L1 cache 12b. Each of CPUs 11a–11p (including L1 caches 12a–12p) is coupled to a respective one of level two (L2) caches 13a–13h. Similarly, each of L2 caches 12a–12h is coupled to a respective one of level three (L3) caches 14a–14d. The lowest level of the memory hierarchy as shown in FIG. 1 is a system memory 16.

Each succeeding lower level from L1 caches 12a–12p of the memory hierarchy is capable of storing a larger amount of information than upper levels, but at a higher access latency. For example, L1 caches 12a–12p may each have 512 64-byte cache lines for a total storage capacity of 32 kilobytes, all at a single cycle latency. L2 caches 13a–13h may each have 2048 128-byte cache lines for a total storage capacity of 256 kilobytes, all at a latency of approximately 10–20 cycles. L3 caches 14a–14d may each have 4096 256-byte cache lines for a total storage capacity of one megabyte, all at a latency of approximately 40–60 cycles. Finally, system memory 16 can store tens or hundreds of megabytes of data at a latency of at least 300 cycles. Given the large disparity in access latencies between the various levels of memories within the memory hierarchy, it is advantageous to reduce the frequency of access to lower levels of memories within the memory hierarchy such as system memory 16.

CPUs 11a–11p, L1 caches 12a–12p, L2 caches 13a–13h, and L3 caches 14a–14d are coupled to system memory 16 via an interconnect 15. Interconnect 15, which can be either a bus or a cross-point switch, serves as a conduit for communication transactions between CPUs 11a–11p and other snoopers coupled to interconnect 15. A typical transaction on interconnect 15 begins with a request, which may include a transaction field indicating the type of transaction, source and destination tags indicating the source and intended recipient(s) of the transaction, respectively, and an address and/or data. Each component connected to interconnect 15 preferably snoops all transactions on interconnect 15 and, if appropriate, responds to the request with a snoop response.

Those skilled in the art will appreciate that data processing system 10 can include many additional components, such as bus bridges, input/output devices, non-volatile storage devices, ports for connection to networks, etc. Because those additional components are not necessary for an understanding of the present invention, they are not illustrated in FIG. 1 or discussed further herein. Although a preferred embodiment of a multiprocessor data processing system is described in FIG. 1, it should be understood that the present invention can be implemented in a variety of system configurations.

In order to obtain valid execution results in data processing system 10, a single view of the contents of memory must be provided to all of CPUs 11a–11p by maintaining a coherent memory hierarchy. A coherent memory hierarchy is maintained through the implementation of a selected coherency protocol, such as the conventional MESI protocol. According to the MESI protocol, an indication of a coherency state is stored in association with each coherency granule (e.g., cache line or sector) of at least all upper level memories. Each coherency granule can have one of four states: Modified (M), Exclusive (E), Shared (S), or Invalid (I), which is typically indicated by two bits in a cache directory. The Modified state indicates that a coherency granule is valid only in the cache memory storing the modified coherency granule and that the value of the modified coherency granule has not been written to (i.e., is inconsistent with) system memory 16. When a coherency granule is indicated as Exclusive, the coherency granule is resident in, of all cache memories at that level of the memory hierarchy, only the cache memory having the coherency granule in the Exclusive state. The data in the Exclusive state is consistent with system memory 16, however. If a coherency granule is marked as Shared in the cache directory, the coherency granule is resident in the associated cache and in at least one other cache at the same level of the memory hierarchy, all of the copies of the coherency granule being consistent with system memory 16. Finally, the Invalid state generally indicates that the data and address tag associated with a coherency granule are both invalid.

The state to which each coherency granule is set can be dependent upon a previous state of the cache line, the type of memory access sought by processors to the associated memory address, and the state of the coherency granule in other caches. Accordingly, maintaining cache coherency in data processing system 10 requires that CPUs communicate messages across interconnect 15 indicating an intention to read or write memory locations. For example, when a CPU requires data not resident in its cache(s), the CPU issues a read request on interconnect 15 specifying a particular memory address. The read request is interpreted by its recipients as a request for only a single coherency granule in the lowest level cache in the CPU. The requested cache is then provided to the requester by a recipient determined by the coherency protocol, and the requester typically caches the data in one of the valid states (i.e., M, E, or S) because of the probability that the cache line will again be accessed shortly.

Figure 2:
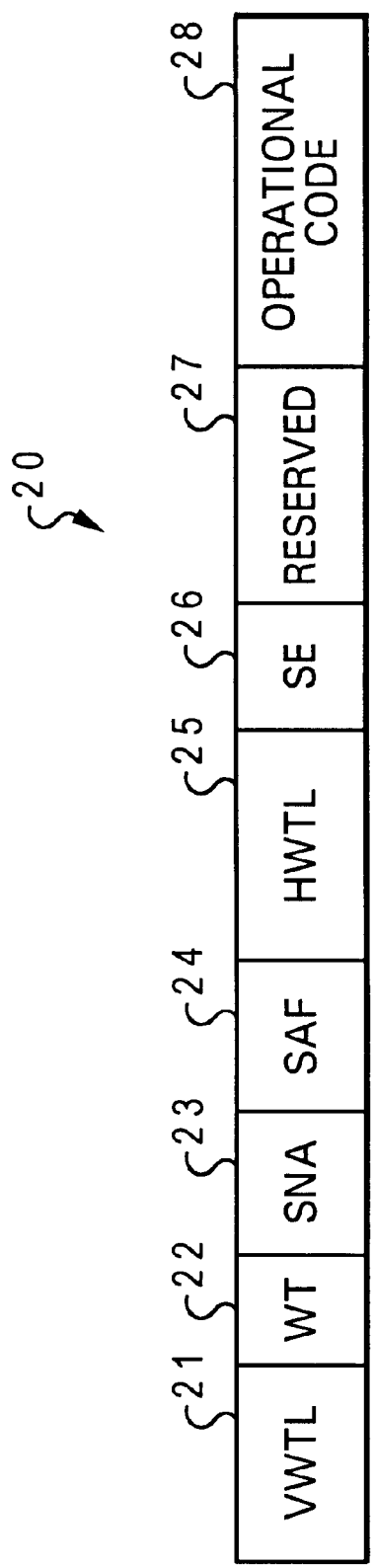
FIG. 2 is a block diagram of a STORE instruction having memory hierarchy control bits to be utilized within the multiprocessor data processing system from FIG. 1, in accordance with a preferred embodiment of the present invention.

With reference now to FIG. 2, there is illustrated a block diagram of a STORE instruction having a group of memory hierarchy control bits to be utilized within the data processing system from FIG. 1, in accordance with a preferred embodiment of the present invention. As shown, a STORE instruction 20 includes a Vertical Write-Through Level (VWTL) field 21, a Write-Through (WT) field 22, a Store__but__do__Not__Allocate (SNA) field 23, a Store__And__Flush (SAF) field 24, a Horizontal Write-Through Level (HWTL) field 25, a Snoop Enable (SE) field 26, a reserved field 27, and an operational code (opcode) field 28.

VWTL field 21, having two bits in this implementation, is valid when WT field 22 equals 1. VWTL field 21 indicates the vertical memory level within a memory hierarchy to which a STORE operation should be applied. With the memory hierarchy as shown in FIG. 1, the bits of VWTL field 21 are preferably assigned as shown in Table I.

Table I

| VWTL bits | operation |
| --- | --- |
| 00 | store down to an L1 cache memory |
| 01 | store down to an L2 cache memory |
| 10 | store down to an L3 cache memory |
| 11 | store down to a system memory |

For example, when the bits within VWTL field 21 of a STORE instruction are "00," the data associated with the STORE instruction is coherently placed (i.e., cache states of other cache memories will be adjusted accordingly to reflect the new state) in an L1 cache memory (such as one of L1 caches 12a–12p from FIG. 1) that is associated with the initiating CPU. As another example, when the bits within VWTL field 21 of a STORE instruction are "11," the data from the STORE instruction is placed in an L1 cache memory, an L2 cache memory (such as one of L2 caches 13a–13h from FIG. 1), and an L3 cache memory (such as one of L3 caches 14a–14d from FIG. 1) that are associated with the initiating CPU as well as a system memory (such as system memory 16 from FIG. 1). The number of bits within VWTL field 21 depends of the number of levels of memories within a memory hierarchy.

WT field 22, having one bit, indicates whether or not there should be a write-through at a cache memory. The bits within WT field 22 are preferably assigned as shown in Table II.

TABLE II

| WT bit | operation |
| --- | --- |
| 0 | if hit, store into current level of cache<br>if miss, allocate entry and store into current level of cache |
| 1 | if (hit AND VWTL < > current level of cache), store into current level of cache and forward STORE to a lower level cache;<br>if (hit AND VWTL = current level of cache), store into current level of cache;<br>if (miss AND VWTL < > current level of cache), conditionally |

TABLE II-continued

| WT bit | operation |
|---|---|
| | allocate entry and store into current level of cache and forward store to lower level cache; if (miss AND VWTL = current level of cache), allocate entry and store into current level of cache |

When the WT bit equals zero (meaning no write-through), the data associated with a STORE instruction is stored in the current level of a cache memory if there is a cache "hit" at the current level; otherwise the data is stored in the current level of the cache memory after a cache line has been allocated if there is a cache "miss" at the current level.

When the WT bit equals on (meaning write-through), the data associated with a STORE instruction is stored in the current level of a cache memory if there is a cache "hit" and the VWTL bits point to the current level of the cache memory; otherwise, the data is also forwarded to the next lower level of the cache memory if there is a cache "hit" but the VWTL bits do not point to the current level of the cache memory.

However, if there is a cache "miss" and the VWTL bits point to the current level of the cache memory, the data is stored in the current level of the cache memory after a cache line has been allocated. Otherwise, if there is a cache "miss" and the VWTL bits do not point to the current level of the cache memory, the data may be stored in the current level of the cache memory after a cache line has been allocated, depending on the status of SNA field 23 and SAF field 24 described infra, and the data is also forwarded to the next lower level of the cache memory.

SNA field 23, having a single bit, indicates whether data should be stored in the current level of a memory hierarchy when there is a cache "miss." The bits of SNA field 23 are preferably assigned as shown in Table III. When the SNA bit equals zero, the data associated with a STORE instruction is stored in the current level of a cache memory regardless of whether there is a cache "hit" or "miss." When the SNA bit equals one, the data is stored in the current level of a cache memory if there is a cache "hit"

TABLE III

| SNA bit | operation |
|---|---|
| 0 | if hit, store into current level of cache<br>if miss, store into current level of cache |
| 1 | if hit, store into current level of cache<br>if (miss AND VWTL < > current level of cache), do NOT store into current level of cache and pass store to lower level of cache<br>if (miss AND VWTL = current level of cache), allocate entry and store into current level of cache |

If there is a cache "miss" when the SNA bit equals one, the data is stored in the current level of the cache memory after a cache line has been allocated when the VWTL bits point to the current level of the cache memory. However, when the VWTL bits do not point to the current level of the cache memory, the data is forwarded to the next lower level of the cache memory, without storing at the current level of the cache memory.

SAF field 24, having a single bit, indicates the level of a memory hierarchy at which the data from a STORE instruction should be stored, above which whether the data should be flushed. The bits of SAF field 24 are preferably assigned as shown in Table IV. When the SAF bit equals zero, the data associated with a STORE instruction is stored in the current level of a cache memory if there is a cache "hit;" otherwise, the data is stored in the current level of the cache memory after a cache line has been allocated if there is a cache "miss."

TABLE IV

| SAF bit | operation |
|---|---|
| 0 | if hit, store into current level of cache<br>if miss, allocate entry and store into current level of cache |
| 1 | if (hit AND VWTL < > current level of cache), store into current level of cache then cast out the line to the lower level cache;<br>if (hit AND VWTL = current level of cache), store into current level of cache;<br>if (miss AND VWTL < > current level of cache), pass store to lower level cache (don't allocate current cache level)<br>if (miss AND VWTL = current level of cache, allocate entry and store into current level of cache |

When the SAF bit equals one, the data associated with a STORE instruction is stored in the current level of the cache memory if there is a cache "hit" and the VWTL bits point to the current level of the cache memory; otherwise, the data is stored in the current level and then the cache line is cast out to the next lower level of the cache memory if there is a cache "hit" and the VWTL bits do not point to the current level of the cache memory. However, if there is a cache "miss" and the VWTL bits point to the current level of the cache memory, the data is stored in the current level of the cache memory after a cache line has been allocated; otherwise, the data is forwarded to the next lower level of the cache memory without allocating a cache line at the current level of the cache memory if there is a cache "miss" and the VWTL bits do not point to the current level of the cache memory.

HWTL field 25, having two bits, is valid when WT field 22 equals one. HWTL field 21 indicates the horizontal cache level to which a STORE operation should be applied. The bits within HWTL field 21 are preferably assigned as shown in Table V.

TABLE V

| HWTL bits | operation |
|---|---|
| 00 | disabled, horizontal caches that are Shared should go to Invalid |
| 01 | horizontal caches that are Shared should be updated with new store data and stay Shared |
| 10 | horizontal caches that are Shared should be updated with new store data and stay Shared as well as caches one level up |
| 11 | horizontal caches that are Shared should be updated with new store data and stay Shared as well as caches two levels up |

For example, if the WT bit equals one, the VWTL bits equal "10," and the HWTL bits equal "10," the VWTL bits will cause the data associated with a STORE instruction to be stored in the L1 and L2 caches that are associated with the initiating CPU, and the HWTL bits will cause all snoopers that have data in a Shared state to update their respective L1 and L2 caches with the new data associated with the STORE instruction, allowing these caches to stay in a Shared state.

SE field 26, having a single bit, controls whether or not a STORE operation needs to be snooped. In order to save directory bandwidth in a software partitioned system, it is useful to know ahead whether or not a STORE operation needs to be snooped by a snooper. This is because a cache memory in one partition is not required to share data with another cache memory in another partition. The bits within SE field 26 are preferably assigned as shown in Table VI.

TABLE VI

| SE bits | operation |
|---|---|
| 0 | snoopers on system bus do NOT have to snoop system bus operations |
| 1 | snoopers on system bus have to snoop system bus operations |

Reserved field 27 reserves a number of bits within STORE instruction 20 for future usage. Opcode field 28 defines the instruction type and operation of STORE instruction 20.

Figure 3:
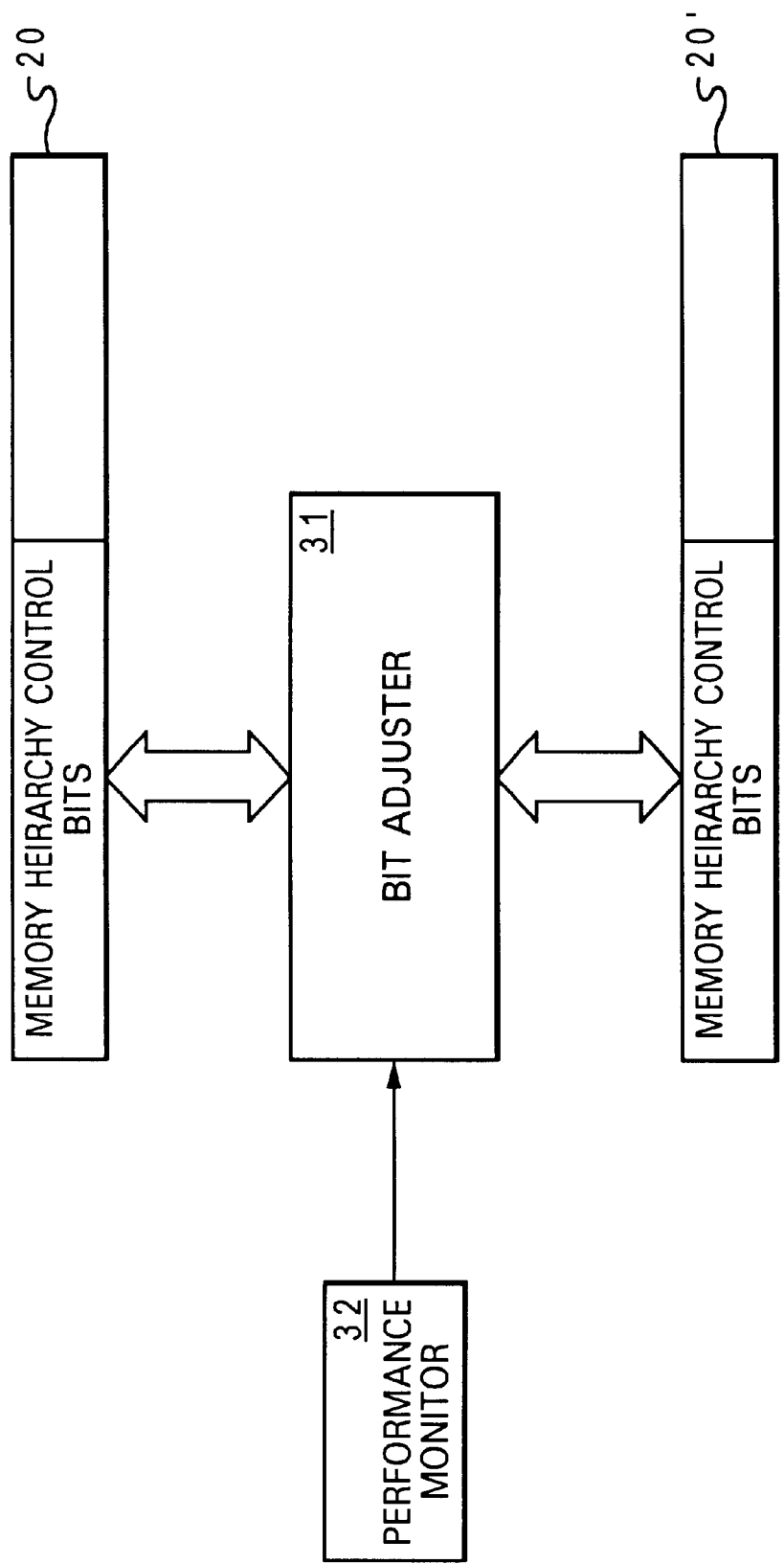
FIG. 3 is a block diagram of an apparatus for adjusting the memory hierarchy control bits within the STORE instruction from FIG. 2, in accordance with a preferred embodiment of the present invention.

Referring now to FIG. 3, there is illustrated a block diagram of an apparatus for adjusting the memory hierarchy control bits within STORE instruction 20, in accordance with a preferred embodiment of the present invention. As shown, a bit adjuster 31 converts STORE instruction 20 to STORE instruction 20' by changing the memory hierarchy control bits within STORE instruction 20. Coupled to bit adjuster 31, a performance monitor 32 informs bit adjuster 31 which one or more of the memory hierarchy control bits needs to be changed in order to achieve optimal performance during system operation. With the preferred data processing system as shown in FIG. 1, both bit adjuster 31 and performance monitor 32 are preferably implemented within a controller for L2 caches 13a–13h.

Although not illustrated in FIG. 3, performance monitor 32 is coupled to each functional unit within a CPU (such as CPUs 11a–11p from FIG. 1) in order to permit the monitoring of all aspects of the operation of the CPU, including reconstructing the relationship between events, identifying false triggering, identifying performance bottlenecks, monitoring pipeline stalls, monitoring idle cycles, determining dispatch efficiency, determining branch efficiency, determining the performance penalty of misaligned data accesses, identifying the frequency of execution of serialization instructions, identifying inhibited interrupts, monitoring hit ratios and other performance characteristics of cache hierarchy, and determining CPI (cycles per instruction) performance efficiency. Performance monitor 32 includes an implementation-dependent number (e.g., 2–8) of performance monitor counters (PMCs) that are utilized to count occurrences of selected events. Performance monitor 32 further includes at least one monitor mode control register (MMCRS) that specifies the function of each of the PMCs. PMCs and MMCR can be implemented as special purpose registers (SPRS) that are software accessible for read or write via MFSPR (move from SPR) and MTSPR (move to SPR) instructions executable by an execution unit; alternatively, PMCs and MMCR may be implemented simply as addresses in I/O space accessible via conventional LOAD and STORE instructions.

Figure 4:
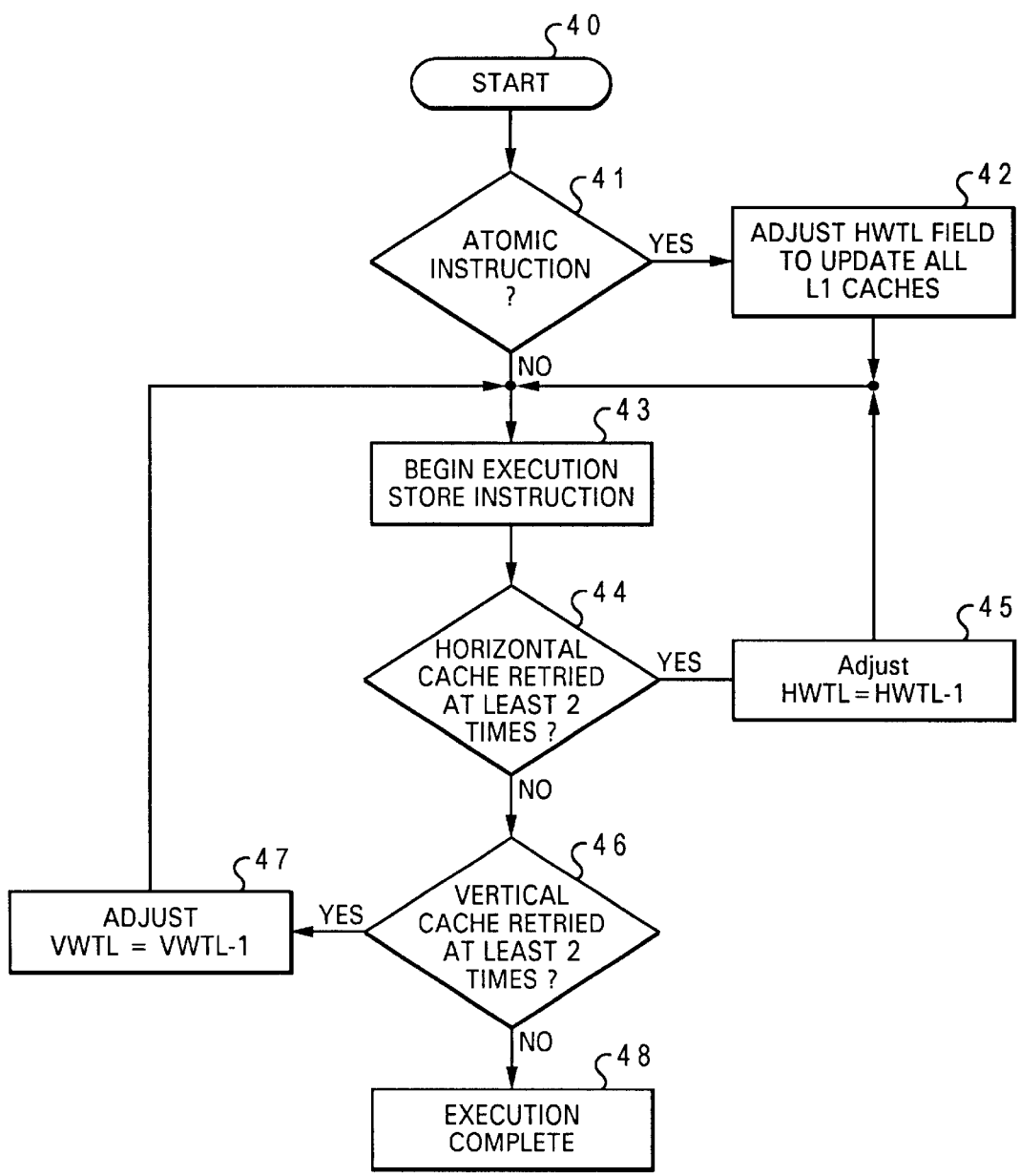
FIG. 4 is a high-level logic flow diagram of a method for adjusting the memory hierarchy control bits within the STORE instruction from FIG. 2, in accordance with a preferred embodiment of the present invention.

With reference now to FIG. 4, there is illustrated a high-level logic flow diagram of a method for adjusting the memory hierarchy control bits within STORE instruction 20, in accordance with a preferred embodiment of the present invention. Starting at block 40, a determination is made as to whether or not STORE instruction 20 is an "atomic" STORE instruction, as shown in block 41. An atomic instruction is an instruction that ensure a cache line in all cache memories at the same level has the same data. An example of an atomic instruction is a STCX instruction within the instruction set of a PowerPC™ processor manufactured by International Business Machines Corporation of Armork, N.Y.

If STORE instruction 20 is an "atomic" STORE instruction, the bits in the HWTL field of STORE instruction 20 are adjusted such that all L1 caches within the entire memory hierarchy will be updated, as depicted in block 42. Otherwise, if STORE instruction 20 is not an "atomic" STORE instruction, the STORE instruction is then executed, as illustrated in block 43.

Next, a determination is made as to whether or not a horizontal cache has been retried for more than two times at this point (meaning the horizontal cache is busy), as shown in block 44. If the horizontal cache has been retried for more than two times, the bits within the HWTL field of STORE instruction 20 are decremented (i.e., HWTL=HWTL−1), as depicted in block 45, and the process returns to block 43. If the horizontal cache has not been retried for more than two times, another determination is then made as to a vertical cache has been retried for more than two times at this point (meaning the vertical cache is busy), as shown in block 46. If the vertical cache has been retried for more than two times, the bits within the VWTL field of STORE instruction 20 are decremented (i.e., VWTL=VWTL−1), as depicted in block 47, and the process returns to block 43. Otherwise, the execution of STORE instruction 20 is completed, as illustrated in block 48

As has been described, the present invention provides an apparatus for adjusting a STORE instruction having memory hierarchy control bits to be utilized within a multiprocessor data processing system. With the present invention, a more versatile control of the storing of data in each level of memory within a multi-level memory hierarchy can be achieved. For the purpose of illustration, the present invention is demonstrated using a multiprocessor data processing system having three levels of cache memory. However, it should be understood that the features of the present invention may be applicable in any data processing system having multiple levels of cache memory.

While the invention has been particularly shown and described with reference to a preferred embodiment, it will be understood by those skilled in the art that various changes in form and detail may be made therein without departing from the spirit and scope of the invention.

What is claimed is:

1. An apparatus for adjusting control bits within an instruction to be utilized within a multiprocessor data processing system having a multi-level memory hierarchy, said apparatus comprising:
   a performance monitor; and
   a bit adjuster, coupled to said performance monitor, for altering at least one of a plurality of memory hierarchy control bits within an instruction, wherein said plurality of memory hierarchy control bits indicates a memory level within said multi-level memory hierarchy to which an updating operation should be applied.

2. The apparatus according to claim 1, wherein said plurality of memory hierarchy control bits include write-through bits for indicating said updating operation should be applied when said write-through field is set.

3. The apparatus according to claim 1, wherein said plurality of memory hierarchy control bits include a snoop enable field bit for controlling whether or not said updating operation needs to be snooped from a system bus.

4. The apparatus according to claim 1, wherein said plurality of memory hierarchy control bits include a store but do not allocate bit for indicating whether data should be stored in a current level of said multi-level memory hierarchy when there is a cache "miss."

5. The apparatus according to claim 1, wherein said plurality of memory hierarchy control bits include a store and flush field bit for indicating a level of said multi-level memory hierarchy at which said data should be stored, above which whether said data should be flushed.

6. The apparatus according to claim 1, wherein said instruction is a STORE instruction.

7. A method for adjusting control bits within an instruction to be utilized within a multiprocessor data processing system having a multi-level memory hierarchy, said method comprising the steps of:

monitoring performance of said multiprocessor data processing system; and in response to said monitored performance, altering at least one of a plurality of memory hierarchy control bits within an instruction, wherein said plurality of memory hierarchy control bits indicates a memory level within said multi-level memory hierarchy to which an updating operation should be applied.

8. The method according to claim 7, wherein said plurality of memory hierarchy control bits include write-through bits for indicating said updating operation should be applied when said write-through field is set.

9. The method according to claim 7, wherein said plurality of memory hierarchy control bits include a snoop enable field bit for controlling whether or not said updating operation needs to be snooped from a system bus.

10. The method according to claim 7, wherein said plurality of memory hierarchy control bits include a store but do not allocate bit for indicating whether data should be stored in a current level of said multi-level memory hierarchy when there is a cache "miss."

11. The method according to claim 7, wherein said plurality of memory hierarchy control bits include a store and flush field bit for indicating a level of said multi-level memory hierarchy at which said data should be stored, above which whether said data should be flushed.

12. The method according to claim 7, wherein said instruction is a STORE instruction.

* * * * *